(Model.)
F. W. POPE.
MACHINE FOR MOLDING BOOT AND SHOE SOLES.
No. 245,558. Patented Aug. 9, 1881.
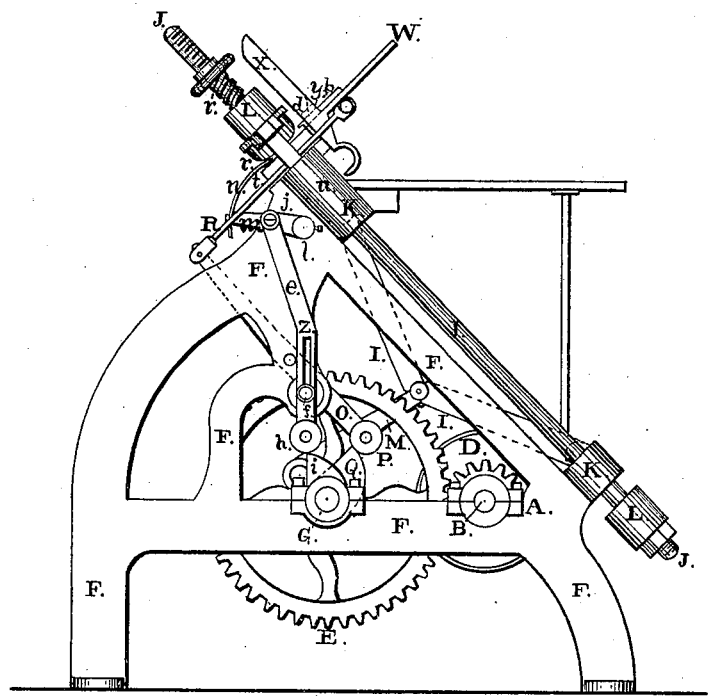
Fig. 1.
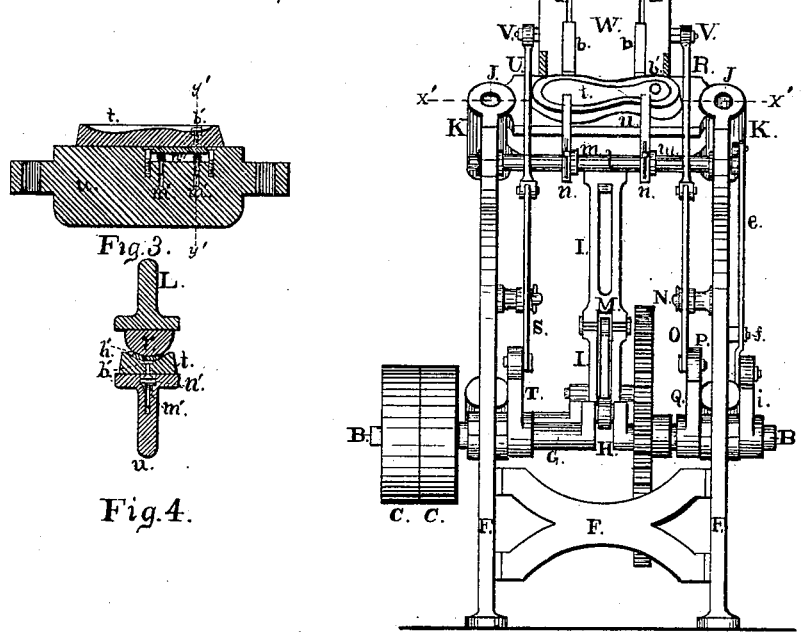
Fig. 3.
Fig. 4.
Fig. 2.
Witnesses:
H. K. Wheeler
L. N. Fairbanks Jr.
Inventor:
Frederick W. Pope
per Durgin & Tuttle
Attorneys.

UNITED STATES PATENT OFFICE.

FREDERICK W. POPE, OF LYNN, MASSACHUSETTS.

MACHINE FOR MOLDING BOOT AND SHOE SOLES.

SPECIFICATION forming part of Letters Patent No. 245,558, dated August 9, 1881.

Application filed November 6, 1880. (Model.)

*To all whom it may concern:*

Be it known that I, FREDERICK W. POPE, of Lynn, in the county of Essex and Commonwealth of Massachusetts, have invented certain new and useful Improvements in Boot and Shoe Sole Molding Machines; and I do hereby declare the following to be a full, clear, and exact description of the invention, reference being had to the accompanying drawings, which form a part of this specification.

The object of my invention is to produce a sole-molding machine of such construction that the soles, when placed upon a stock-holding table, shall be automatically fed to and discharged from the molding-tools without the presence or assistance of the operator.

The invention consists in the construction and combination, with a sole-molding mechanism, of a mechanism whereby the sole is carried to, regulated upon, and discharged from the molding-tools.

It further consists in the combination, with the die or molding mechanism, of a means whereby the position and pressure of the molding-tools are automatically varied to suit the varying thickness of different soles.

In the accompanying drawings, wherein similar letters of reference denote like parts, Figure 1 is a side elevation of a machine constructed in accordance with my invention. Fig. 2 is a back-end elevation of the machine with all above the bottom mold removed. Fig. 3 is a sectional view of the bottom mold $t$ and bed $u$, made upon the dotted line $x'\ x'$. Fig. 4 is a cross-section of both tools, made upon the dotted line $y'\ y'$.

The frame-work of the machine is designated by the letter F, placed upon different parts thereof. In the bearings A A, fixed one upon each side of the machine-frame, turns the horizontal shaft B. Upon one end of the shaft B are two pulleys, C C, one loose, and the other made fast thereto, the latter being designed to receive the driving-power of the machine. A small gear, D, made fast upon the revolving shaft B, meshes into the larger gear E, made fast upon the shaft G, and thus is motion imparted to said shaft G. The shaft G is constructed with a double crank, H, near the center thereof, and carries three cam-wheels. Connected with this crank H is a bar, M, the other end of which is connected with a toggle-joint formed by the union of two bars, I I. These bars I I, at their opposite ends, are jointed, one to the stationary cross-bar $u$, and the other to the bottom cross-head or yoke, L, of a reciprocating frame. Said frame consists of two rods, J J, arranged to slide in bearings K K, and connected at their ends by yokes or adjustable cross-bars L L.

The tool or tools whereby the molding process is effected consist of a concaved mold secured to the cross-bar $u$, and a counter convex form, $r$, secured to the under side of the cross-bar L.

From the foregoing it will be readily understood that by reciprocating the rods J J, which action takes place at every revolution of the crank H, the form $r$ is brought down into the mold $t$ in such manner that a sole-blank placed upon the mold $t$ is pressed into conformity therewith. Such is the construction and operation of sole-molding machines in general use at the present time.

The mechanism thus far described is not new, and, separately, is not claimed as a part of this invention.

It will now be observed that in the foregoing description no mechanism is shown whereby the distance between the form $r$ and mold $t$ is automatically varied to admit soles of varying thickness, and in a machine constructed strictly as before described the molds must, to prevent breakage in the machine, be separately adjusted according to the thickness of the sole. In machines heretofore constructed this difficulty has been obviated by means of an elastic rubber packing placed under the mold $t$, between the same and the cross-bar $u$, to which it is attached; but this form of packing under the mold has been found objectionable in use, from the fact that packing soon wears and loses its elasticity, and fails to completely perform its office.

In my improved machine the mold $t$ is attached directly to the cross-bar $u$, and the cross-bar L, to which is attached the form $r$, instead of being fast upon is arranged to slide upon the rods J J, the springs $r'\ r'$ coiled spirally about the rods J J, and, butting against the nuts upon the end of said rods J J, serve to keep the bar L down against two other nuts placed beneath said bar upon the rods J J. These last-mentioned nuts regulate the distance between the form r and mold t, while the elasticity of the springs r' r', which may be increased or decreased by means of the nuts upon the ends of the rods J J, serves to determine the pressure upon the sole. This combination renders it possible to use springs of such length that a slight variation of distance between the mold makes no perceptible difference in the pressure upon the sole, so that if the molds are adjusted according to the thinnest soles and one of great thickness is introduced, the bar L pushes upward the springs r' r' without greatly increasing the pressure upon the sole. Should the springs r' r' lose any of their elasticity, it may be restored by turning downward the nuts upon the ends of the rods J J. This arrangement dispenses with elastic packing, and constitutes one feature of my invention.

The mechanism whereby the sole is carried forward to the mold is constructed and arranged as follows: The lever O is arranged to turn upon the pin N, which projects from the machine-frame. This lever O, at one end thereof, is jointed to the rod R, and at the other end thereof carries a wheel, P, the rim of which treads upon the cam-wheel Q. On the opposite side of the machine is another similar lever, S, pivoted in like manner, and likewise provided with a wheel at the bottom end thereof, which treads upon the cam T. Said cams Q and T are arranged to revolve with the shaft G, and the levers O and S are kept in contact with their respective cams Q and T by means of springs extending from the levers to the frame-work of the machine. The rods R and U, at their upper ends, are jointed to the cross-bar V. This bar V is connected with a plate b b by means of pins or rivets which pass through vertical slots in the plate W. It will now be evident that by revolving the cams Q and T motion is imparted to the levers O S and rods R U, in such manner as to reciprocate the bar V and plate b b, said bar and plate being allowed to slide upon opposite sides of the plate W. This plate W is fixed at right angles upon another plate, X, which forms the stock-table and feed-bed of my machine. This plate X is provided with a slot or mouth, y, extending through the same, along the edge of which is fixed the plate W. In connection with this slot or mouth y is a narrow flexible lip, d, one edge of which is attached to the plate X in such manner that the other edge, which extends over the mouth y, recedes downward when pressed upon from above; thus is the aperture of said mouth automatically varied to admit the passage through the same of soles of different thickness. This plate X is arranged upon the machine-frame with such an inclination that soles when placed thereon slide downward to the plate W. The mouth y is arranged directly above and in a line with the top surface or face of the mold t. Said mold t has an inclination corresponding with that of the plate W, so that a sole in sliding through the mouth y passes in nearly a straight line to the face of the mold t. When the sole passes downward far enough to cover the face of the mold t it is arrested by means of a stopping mechanism constructed and arranged as follows: An angular lever, e, provided with a slot, Z, is arranged to slide and rotate upon a pin, f, extending from the machine-frame. This lever e, at one end thereof, carries the wheel h, arranged to tread upon the cam i, the latter being adapted to revolve with the shaft G. The lever e, at the other end, is jointed to a crank, j, the axis whereof is the revolving shaft l, the object being to reciprocate the shaft l by each revolution of the cam i. Upon the shaft l are two arms, m m, adapted to be adjusted to different positions thereon by means of set-screws employed in the usual manner. Each of the arms m m, at the outer end thereof, carries a finger, n. These fingers n n, at each turn of the shaft l, project forward to the mold t and serve to stop the sole directly upon the center of the mold, as hereinafter described. The point at which the fingers strike the mold may be determined by means of the arms m m upon the shaft l, as before described.

The mechanism for starting the formed sole off the mold t is as follows: In the bed u, and directly under the mold t, is constructed a groove or channel, within which a plate, n', is arranged to slide up and down. Beneath the plate n' are two spiral springs, m' m', the whole force of which is exerted in pushing upward the plate n'. Attached to one end of this plate n' is a pin, b', arranged to slide up through a hole in the mold t. When, now, the form r sets down into the mold t the pressure thereof forces down the pin b', carrying with it the plate n', as shown in Fig. 4; but when, after the molding process is completed, the bar L begins to lift, carrying with it the form r, the force of the springs m' m' operate to force the pin b' upward against the sole. The effect is to overcome the adhesion between the sole h' and the mold t, whereupon the sole slides downward to the floor of the apartment containing the machine.

The operation of my improved sole-molding machine is very simple. The operator, taking a bunch of soles cut to the size desired, places them edgewise upon the plate X, which is so inclined that the soles placed thereon continually slide downward to the upright plate W. In this position the sole nearest the plate W is directly over the mouth or slot y, which is placed directly over the iron mold or form t. As, now, the shaft G begins to revolve the cams Q and T, operating upon their respective levers O and S, cause the reciprocating bar V to slide downward, whereupon the plates b b, striking upon the upper edge of the sole which lies nearest the plate W, force the same down through the mouth y onto the mold t. The cam i is adjusted upon the shaft G in such a position that, acting upon the lever e, it causes the fingers n n at this moment to fly upward against the form t at a point where it is desired to arrest the downward slide of the sole by allowing the same to rest upon the fingers *n n*. The crank H, in connecting with the toggle-joint I I, forces downward the frame J J, thereby setting the form or mold *r* down into the mold *t*. As, now, the shaft G goes farther round the tools are forced together, and by the pressure thus obtained the sole is made to assume pattern of the mold *t*. The cams upon the shaft G are so arranged that at this moment all support is removed from their respective levers, and in consequence the shaft *l*, turning backward, throws down the fingers *n n*, while the bar V, carrying upward the slides *b b*, allows another sole to come into a position suitable for receiving the next downward movement thereof. A still further revolution of the shaft G, by forcing upward the frame J, removes the pressure from the mold *t*. The pin *b'*, operating as before described, now lifts up the sole, which then, by its own weight, slides off the inclined mold of the machine to the floor below. When the frame J reaches its former position the revolution of the shaft G is complete, and with subsequent revolution thereof a new operation of the machine begins.

Having thus described the construction and operation of my machine in a manner sufficient to enable one skilled in the art to manufacture and use the same, reference being had to the accompanying drawings, I now proceed to state that what I claim as my invention, and desire to secure by Letters Patent, is—

1. In a sole-molding machine, the combination, with a table, X, for holding soles, and provided with a slotted mouth, *y*, through which soles are discharged, of a flexible lip, *d*, arranged, as shown, to automatically vary the aperture of said mouth to receive soles of different thickness, substantially as set forth.

2. In a sole-molding machine, the combination, with a plate, X, provided with the variable mouth *y*, of a plate, W, having a plate, *b b*, and bar V, arranged to slide thereon, substantially as and for the purpose described.

3. The combination, in a sole-molding machine, of a slotted plate, X, a flexible lip, *d*, a plate, W, having a plate, *b b*, and bar V, arranged to slide thereon, and mechanism for reciprocating the same consisting of the rods R U, the levers O S, and cams Q T, all constructed and combined substantially as shown, for purposes stated.

4. In a sole-molding machine, the combination of a flexible lip, *d*, a slotted plate, X, and vertical plate W, all constructed and arranged substantially as shown, for purposes described.

5. In a sole-molding machine, the combination, with a mechanism for shaping soles, of mechanism consisting of a reciprocating shaft, *l*, carrying the fingers *n n*, laterally adjustable thereon, a lever, *e*, and cam *i*, for regulating the position of the sole upon the mold, all constructed and combined substantially as and for the purposes hereinbefore described.

6. In a sole-molding machine, the combination, with a reciprocating shaft, *l*, carrying stop-fingers *n n*, of the lever *e*, provided with slots and fulcrumed upon the pin *f*, as shown, to have sliding and rotating movements imparted thereto, whereby the shaft *l* may be reciprocated, substantially as set forth.

FREDERICK W. POPE.

Witnesses:
WILLIAM F. DODGE,
WILLIAM C. LAMPHIER.